United States Patent [19]

Sakamoto et al.

[11] Patent Number: 5,174,668
[45] Date of Patent: Dec. 29, 1992

[54] PRINTER CAPABLE OF VERTICAL AND LATERAL WRITING

[75] Inventors: Koichiro Sakamoto, Osaka; Hiroyuki Shigematsu, Nara, both of Japan

[73] Assignee: Sharp Kabushiki Kaisha, Osaka, Japan

[21] Appl. No.: 829,564

[22] Filed: Feb. 5, 1992

Related U.S. Application Data

[63] Continuation of Ser. No. 498,574, Mar. 26, 1990, abandoned.

[30] Foreign Application Priority Data

Apr. 1, 1989 [JP] Japan .................................. 1-83336

[51] Int. Cl.[5] .............................................. B41J 11/42
[52] U.S. Cl. ...................................... 400/582; 400/63; 400/76; 400/624
[58] Field of Search ................ 400/578, 579, 642, 63, 400/121, 624, 625, 629, 76, 582, 583.3; 355/308, 311, 313, 316, 317; 271/3.1, 226, 227, 236, 241, 255, 171; 395/115, 116

[56] References Cited

U.S. PATENT DOCUMENTS

| 4,511,904 | 4/1985 | Takahashi | 271/171 |
| 4,607,572 | 8/1986 | Pou et al. | 400/708 |
| 4,739,369 | 4/1988 | Yoshiura et al. | 271/3.1 |
| 4,780,740 | 10/1988 | Fukae | 271/255 |
| 4,874,160 | 10/1989 | Yamamoto | 271/171 |
| 4,908,673 | 3/1990 | Muramatsu | 271/3.1 |
| 4,934,845 | 6/1990 | Kato | 400/708 |

FOREIGN PATENT DOCUMENTS

| 2056986 | 4/1972 | Fed. Rep. of Germany . | |
| 3425679 | 1/1986 | Fed. Rep. of Germany . | |
| 69630 | 6/1977 | Japan | 400/708 |
| 133331 | 11/1978 | Japan | 400/121 |
| 150592 | 9/1982 | Japan | 400/708 |
| 67457 | 3/1983 | Japan | 400/121 |
| 54872 | 3/1985 | Japan | 400/583.3 |
| 29566 | 2/1986 | Japan | 400/121 |
| 61-157071 | 7/1986 | Japan . | |
| 195865 | 8/1986 | Japan | 400/121 |
| 195867 | 8/1986 | Japan | 400/121 |
| 215077 | 9/1986 | Japan | 400/708 |
| 41074 | 2/1987 | Japan | 400/708 |
| 50151 | 3/1987 | Japan | 400/121 |
| 39350 | 2/1988 | Japan | 400/121 |
| 162260 | 7/1988 | Japan | 400/708 |

OTHER PUBLICATIONS

Patent Abs. of Japan vol. 13, No. 545, Dec. 1989.
Patent Abs. of Japan vol. 12, No. 257, Jul. 1988.
Patent Abs. of Japan vol. 11, No. 11, Jan. 1987.
IBM Technical Disclosure Bulletin, "Page Image Printing", vol. 27, No. 10A Mar. 1985, pp. 5788-5789.

Primary Examiner—Edgar S. Burr
Assistant Examiner—Christopher A. Bennett
Attorney, Agent, or Firm—Nixon & Vanderhye

[57] ABSTRACT

Here is disclosed a printer capable of printing character information in the same printing format irrespective of the direction in which sheets of paper (30) for printing are loaded. Such a printer comprises a cassette (20) which can receive the printing sheets (30) either in a longitudinal direction or in a traverse direction, a detecting portion (18) for detecting direction of the printing sheets (30) loaded in the cassette (20), a format setting key (6a) for setting a format including feeding manner of the printing sheets (30), alignment direction of characters and the like, and a control portion (10). The control portion (10) determines whether or not the actual direction of the printing sheets (30) detected by the detecting portion (18) corresponds to the direction having been set by the setting key (6a). If they do not correspond to each other, the control portion (10) controls the printer such that printing data read out of a document buffer (12) where character information is stored are rotated by 90°, written in a printing buffer (17) and then supplied from the printing buffer (17) to a laser printer (4).

4 Claims, 5 Drawing Sheets

PRINTER CAPABLE OF VERTICAL AND LATERAL WRITING

This is a continuation of application Ser. No. 07/498,574, filed Mar. 26, 1990, now abandoned.

BACKGROUND OF THE INVENTION

1. Field of the Invention

The present invention generally relates to printers, and more particularly, to a printer capable of writing characters both vertically and laterally.

2. Description of the Background Art

Some word processors are known as allowing selection of a desired format among a plurality of formats and printing characters in the selected format. In such word processors, a format is designated according to feeding direction of paper to be fed, alignment direction of characters to be printed, and the like. More specifically, at the time of loading sheets of paper into a cassette for feeding, selection can be made between a longitudinal feeding manner where the longitudinal direction of the printing sheets is parallel with the feeding direction, and a traverse feeding manner where the longitudinal direction of the printing sheets is orthogonal with the feeding direction. Additional selection is made between a lateral printing where alignment direction of characters to be printed is parallel with the moving direction of a printing head (perpendicular to the feeding direction), and a vertical printing where alignment direction of the characters is orthogonal with the moving direction of the printing head.

In FIG. 8A, there are shown sheets of paper 40 being fed into a printer 50 in the longitudinal feeding manner. When a format of "longitudinal feeding and lateral writing" has been set, the alignment direction of characters is orthogonal with the longitudinal direction of a printing sheet 40a (parallel with feeding direction A of the printing sheets 40), as shown in FIG. 8A with a character-string of "ABCD".

If the printing sheets 40 of A4 size are fed into the printer 50 in the so-called traverse feeding manner, as shown in FIG. 8B, while the above-mentioned format "longitudinal feeding and lateral writing" has been set, character-strings will be printed only in an area 11 of a printing sheet 40b which could overlap with the printing area of the printing sheet 40a fed in the longitudinal feeding manner. However, since the remaining printing area 12 (corresponding to an area 13 indicated by two-dot chain line on the longitudinally fed sheet 40a in FIG. 8A) do not overlap with the traversely fed sheet 40b, printing information for the area 12 can not be printed.

SUMMARY OF THE INVENTION

An object of the present invention is to enable printing of data in a desired manner whichever loading state has been selected for printing paper in a printer.

According to the present invention, sheets of paper can be loaded either in a longitudinal direction or in a traverse direction into a cassette for storing printing paper. Direction of the printing sheets to be fed and alignment direction of characters to be printed are designated with setting means to set a printing format. A detector detects whether direction of the printing paper, or the longitudinal direction of the sheets is parallel or orthogonal with the feeding direction. Control means controls the printer such that even when the detected direction of the printing paper do not correspond to that having been set for the printing paper, character information is read out of storage means so that printing is executed in the set printing format, and then applied to printing means. More specifically, printing manner of the printing means can be adjusted to any feeding manner by controlling the reading operation of the stored contents, corresponding to the direction of the printing sheets to be fed. Accordingly, printing can be effected in a desired format at any time, preventing the printing operation going on beyond an edge of a printing sheet.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
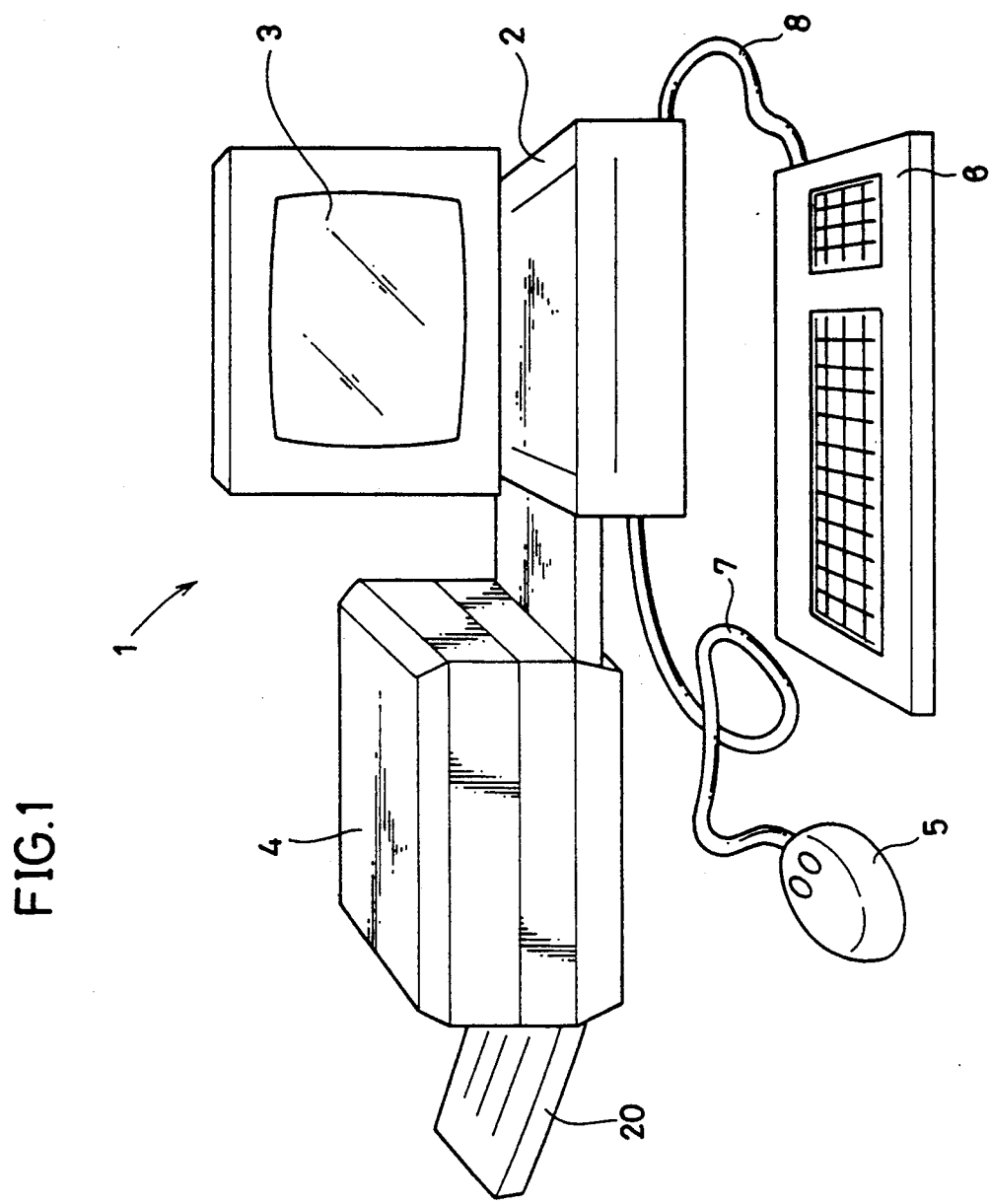
FIG. 1 is a perspective view of a word processor and its peripheral equipment to which an embodiment of the present invention has been applied.

Referring to FIG. 1, description will be made on structure of a word processor and its peripheral equipment to which an embodiment of the present invention has been applied. On a main processing unit 2 of the word processor 1, there is rested a display unit 3 as constituted of a CRT (Cathode Ray Tube), for example. The main processing unit 2 is connected to a laser printer 4, and to an input device 5 called, for example, a mouse, and a keyboard 6 through connection cords 7 and 8, respectively.

Figure 2:
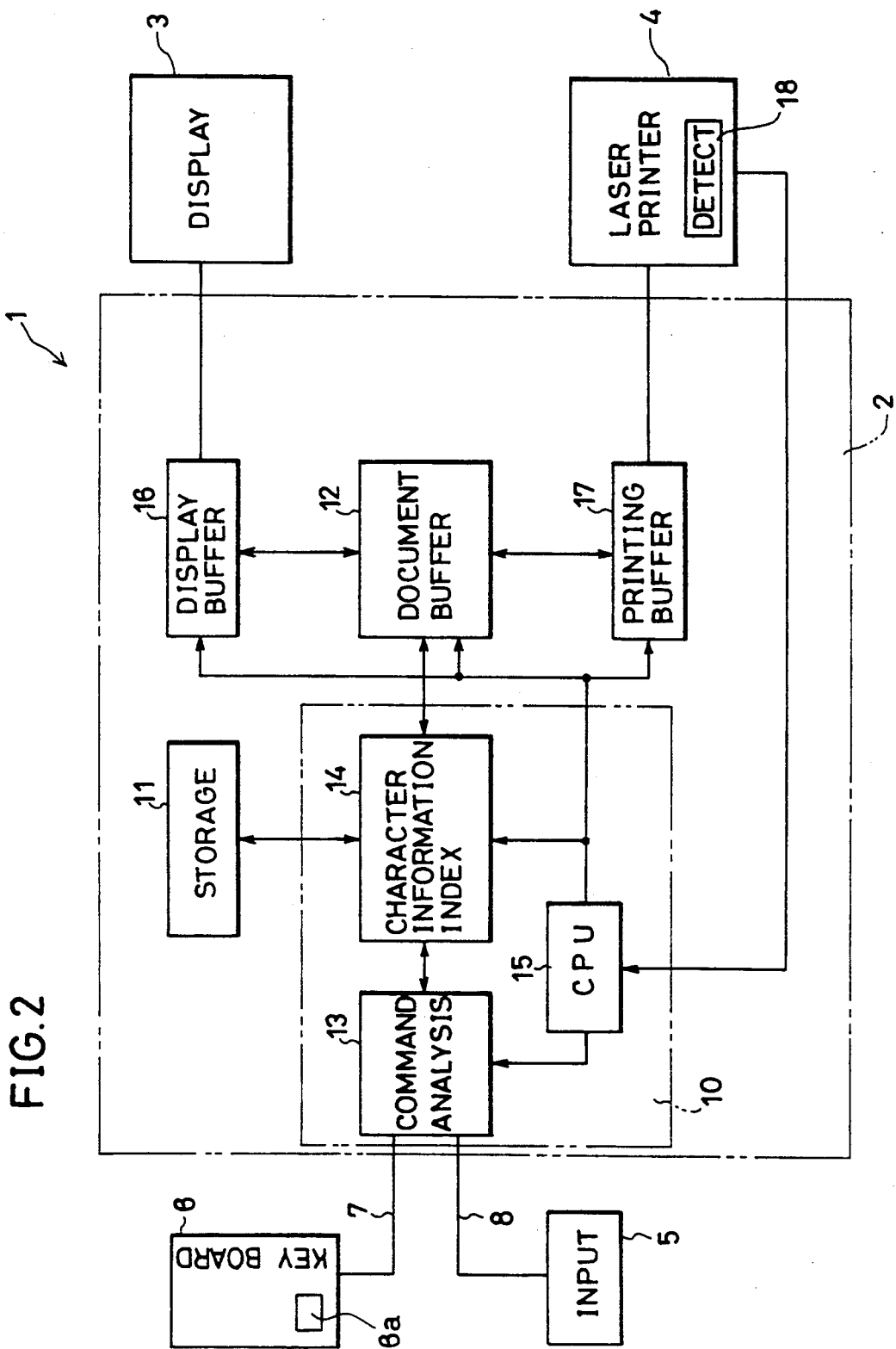
FIG. 2 is a block diagram showing electrical structure of the word processor and its peripheral equipment shown in FIG. 1.

Referring to FIG. 2, electrical structure of the word processor 1 and its peripheral equipment will be described. The main processing unit 2 is provided with a main control portion 10 for controlling the entire apparatus, to which a storage 11 for storing a plurality of character fonts, a document buffer 12 for storing document information corresponding to entry information from the keyboard 6, and the like are connected. The main control portion 10 comprises a command analyzing portion 13 for analyzing several kinds of commands entered from the input device 5 and the keyboard 6, document information index portion 14 for reading out the character fonts in the storage 11 in response to output of the command analyzing portion 13, and a central control portion 15 for controlling all the above.

The document information stored in the document buffer 12 is supplied to the display unit 3 through a display buffer 16 and also to the laser printer 4 through a printing buffer 17. The laser printer 4 comprises a detecting portion 18 for detecting whether printing sheets to be fed have been loaded in the longitudinal or the traverse direction. Output of the detecting portion 18 is applied to the central control portion 15. The keyboard 6 is provided with a format setting key 6a for setting a format including size of printing paper, paper feeding manner, alignment direction of characters, and the like.

Figure 3:
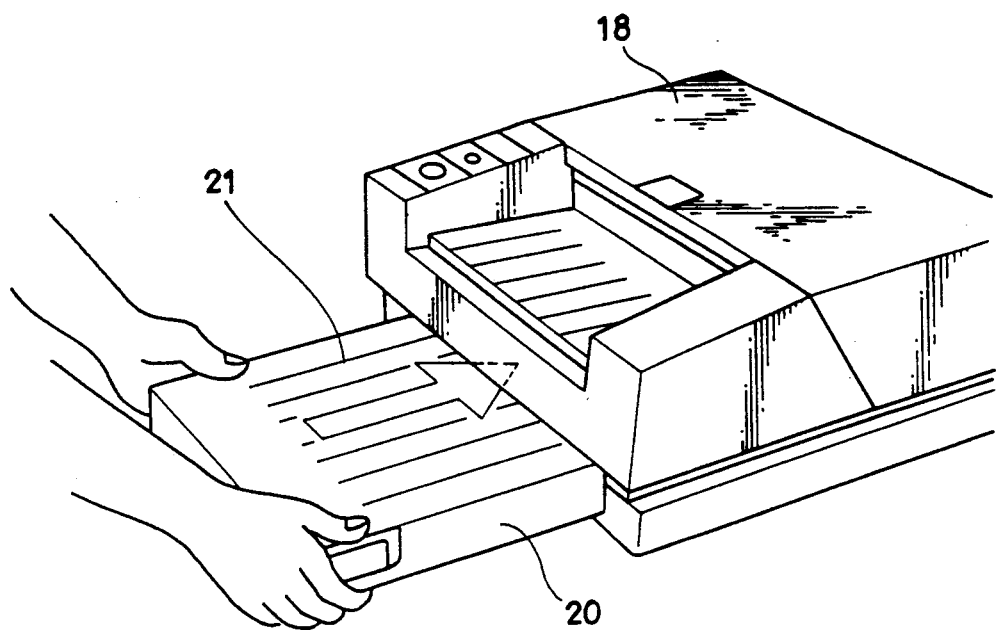
FIG. 3 is a perspective view showing a cassette being inserted into a laser printer, which feeds sheets of paper for printing.
Figure 4:
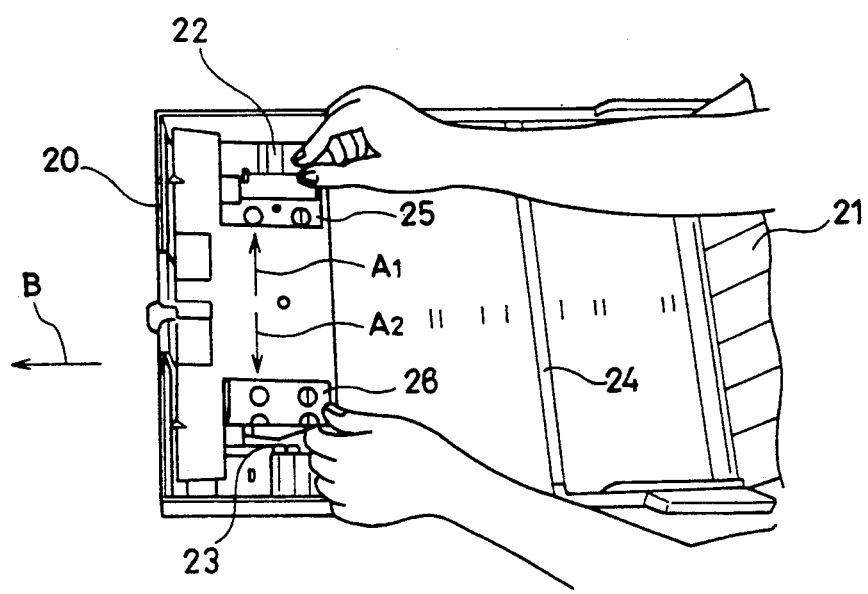
FIG. 4 is a perspective view showing the cassette in FIG. 3 with its lid opened.

In FIG. 3, there is shown a cassette 20 for feeding printing sheets being inserted into the laser printer 4, and in FIG. 4, there is shown the cassette 20 with its lid 21 opened. The printing sheets loaded in the cassette 20 are of a A5 to A3 size, for example. Further, at the time of loading the printing sheets of the respective size, selection can be made between the longitudinal feeding manner where the longitudinal direction of the printing sheets is parallel with an inserting direction B of the cassette and the traverse feeding manner where the longitudinal direction is orthogonal with the cassette inserting direction B.

In the cassette 20, depending on size of the printing sheets and the feeding manner, length of the printing sheets in the cassette inserting direction is regulated by a trailing edge regulating plate 24 while another length of the printing sheets in their width direction orthogonal with the cassette inserting direction B is regulated by opposite edges regulating plates 25 and 26 which can move in the directions of arrows A1 and A2 through operation of levers 22 and 23, as shown in FIG. 4.

Figure 5A:
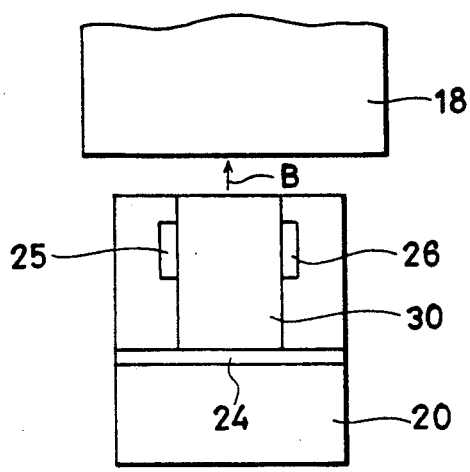
FIGS. 5A and 5B are typical illustrations for explaining feeding manners of printing sheets according to an embodiment of the present invention.
Figure 5B:
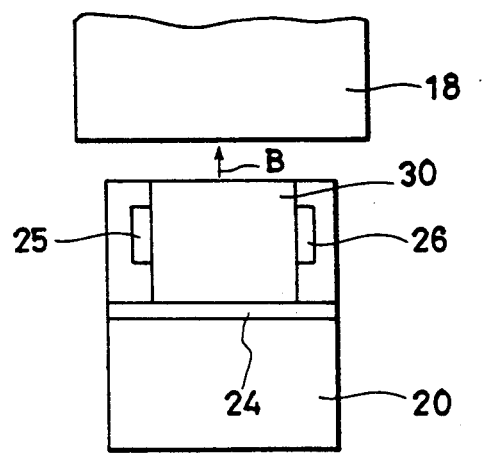

In FIGS. 5A and 5B, there are shown typical feeding manners of the printing sheets. In FIG. 5A, printing sheets 30 of A4 size have been loaded in the longitudinal direction and in FIG. 5B, the printing sheets 30 of A4 size have been loaded in the traverse direction. In the traverse feeding manner, spacing between the opposite edges regulating plates 25 and 26 is larger than that in the longitudinal feeding manner, and the trailing edge regulating plate 24 is not retracted so far as in the longitudinal feeding manner. The size and the feeding manner of the printing sheets loaded in the cassette 20 are detected by the detecting portion 18 which is provided in association with the respective regulating plates 24, 25 and 26. The detector portion 18 may be implemented in a variety of ways which would be apparent to one of ordinary skill in the art. By way of example only, the detector portion 18 having a paper orientation (and size) sensing mechanism may be implemented as taught in U.S. Pat. No. 4,786,042, which issued on Nov. 22, 1988. A format where printing is executed in a direction parallel with the inserting direction B of the cassette 20 will be referred to as "vertical writing" and another format of printing in a direction orthogonal with the inserting direction B will be referred to as "lateral writing", hereinafter.

Figure 6A:
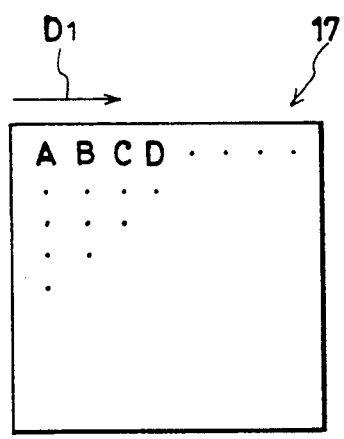
FIGS. 6A and 6B are illustrations for explaining image developing operation according to an embodiment of the present invention.
Figure 6B:
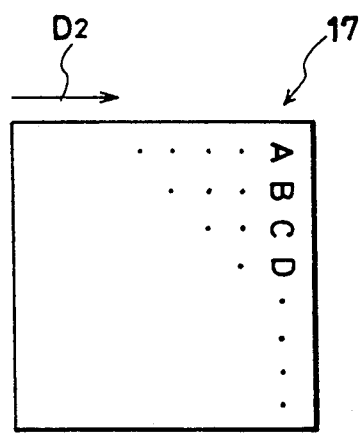

Referring to FIGS. 6A and 6B, image developing operation will be described. Assuming for example that a format of "A4 longitudinal feeding and lateral writing" is set to execute a printing such that a printing sheet of A4 size is fed in the longitudinal feeding manner and characters are written in the lateral direction, data in the document buffer 12 are read out for image development without making any change and stored in the printing buffer 17 as printing data in such an arrangement as shown in FIG. 6A. When the printing is to be executed, the printing data are sequentially addressed in the direction indicated by arrow D1 and supplied to the laser printer 4. At this time, if the printing sheets have been loaded in the longitudinal direction, the printing in the format "A4 longitudinal feeding and lateral writing" can be realized normally.

If the printing sheets are loaded in the traverse direction while this format of "A4 longitudinal feeding and lateral writing" has been set, the image is developed with a 90° rotation in reading out the printing data from the document buffer 12 so that the printing data are stored in the printing buffer 17 in an arrangement as shown in FIG. 6B. More specifically, address translation is made such that the printing data to be printed with lateral writing in the upper-most row of the longitudinally fed printing sheet are printed with vertical writing in the right-most column of a traversely fed printing sheet. Meanwhile, in this case, the respective characters are rotated clockwise by 90°.

In this manner, the printing data stored in the printing buffer 17 are sequentially read out in the direction indicated by arrow D2. Accordingly, a printing which has been rotated clockwise by 90° is realized. Therefore, even if printing is effected on a traversely fed printing sheet when the format of "A4 longitudinal feeding and lateral writing" has been set, the same printing results as in the case of a longitudinally fed printing sheet can be obtained through the above-described image development. In other words, the same printing results can be obtained through the image development, irrespective of feeding manner of the printing sheets.

Figure 7:
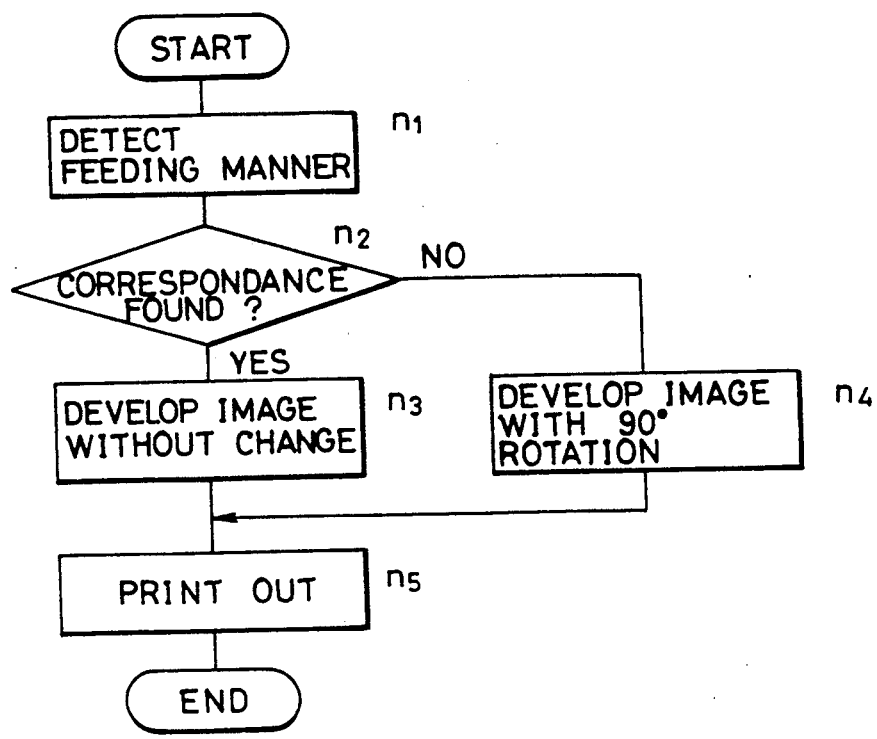
FIG. 7 is a flow chart for explaining operation of a printer according to an embodiment of the present invention.
Figure 8A:
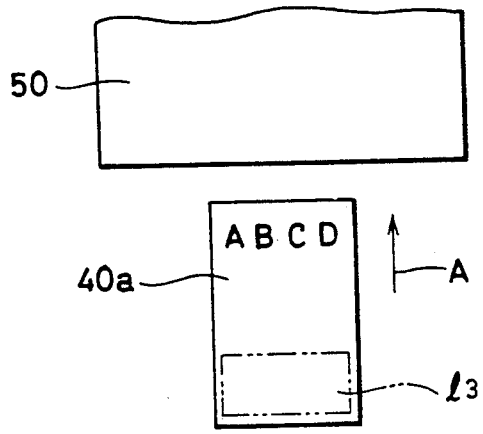
FIGS. 8A and 8B are illustrations for explaining printing manners of the printer which has been described as a background art.
Figure 8B:
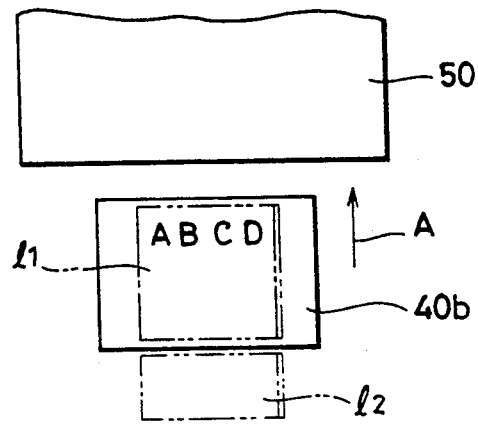

Referring to FIG. 7, operation of the printer according to an embodiment of the present invention will be described.

At step n1, feeding manner of the printing sheets loaded in the cassette 20 is detected by the detecting portion 18.

At step n2, it is determined whether or not the detected feeding manner corresponds to that in a presently set format. If it does, the operation proceeds to step n3 where printing data in the document buffer 12 are developed in an image without making any change and stored in the printing buffer 17.

When the detected feeding manner does not correspond to that having been set in the format, the operation proceeds to step n4 where the printing data read out from the document buffer 12 are rotated by 90°, as described above, before written in the printing buffer 17.

At step n5, the printing data having been written in the printing buffer 17 are supplied to the laser printer 4 which executes printing.

As has been described above, even when the feeding manner set in a format for printing sheets does not correspond to that of the printing sheets actually loaded in the cassette 20, the same printing results as in the case where they do correspond to each other can be obtained. Therefore, even if the printing sheets are loaded in a manner different from that having been set in the format, such an undesirable printing operation as has been described in the "description of the background art" can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printer, comprising:

storage means for storing character information to be printed;

feeding means for feeding printing sheets of paper for printing;

printer buffer means for storing character information read from said storage means;

means for designating a predetermined printing format;

detecting means for detecting the orientation of said printing sheets fed by said feeding means and for outputting detected signals, said detecting means including means for detecting the width of said printing sheets, where said width is the printing sheet dimension transverse to the feeding direction, prior to said character information being read from said storage means and received by said printer buffer means;

printing means for printing characters stored in said printer buffer means on said printing sheets fed by said feeding means; and control means for controlling said printing means in response to the detected signals from said detecting means such that the printing means prints the characters in said predetermined printing format regardless of the detected orientation of said printing sheets, said control means including means for comparing said detected signals and said predetermined printing format, and means for accessing said character information for each sheet to be printed and for rotating said character information by 90° if there is not a predetermined correspondence between said predetermined printed format and said detected signals and for writing the rotated character information in said printer buffer means.

2. A printer for printing on printing sheets, comprising:

storage means for storing character information to be printed;

feeding means having a receiving portion which receives said printing sheets either in a predetermined direction or in a direction orthogonal with the predetermined direction for feeding said printing sheets loaded in said predetermined direction and in the direction orthogonal with said predetermined direction, from said receiving portion;

printer buffer means for storing character information read from said storage means, printing means for printing the character information stored in said printer buffer means on said printing sheets fed by said feeding means;

setting means for setting a printing format by designating the orientation of said printing sheets to be fed and alignment direction of characters to be printed;

detecting means for detecting the orientation of said printing sheets fed by said feeding means and for generating printing sheet orientation indicative output signals prior to said character information being read from said storage means and received by said printer buffer means said detecting means including means for detecting the width of said printing sheets, where said width is the printing sheet dimension transverse to the feeding direction; and control means for controlling the printer, said control means including determining means, responsive to said printing sheeting orientation indicative output signals, for determining the correspondence between said printing format set by said setting means and the actual orientation of said printing sheets, such that even when the actual orientation of said printing sheets detected by said detecting means does not correspond to that having been set by said setting means for said printing sheet to be fed, the character information stored in said storage means are read out, processed, stored in said printer buffer means and applied to said printing means so that printing is executed in the printing format having been set by said setting means.

3. The printer according to claim 2, wherein the printing format set by said setting means includes either a vertical writing format or a lateral writing format.

4. The printer according to claim 2, wherein said control means comprises:

reading means for reading out the character information stored in said storage means while rotating each character by 90°, in response to the determination of non-correspondence by said determining means and for loading said character information in said printer buffer means.

* * * * *